US010769842B2

(12) United States Patent
Peterson et al.

(10) Patent No.: US 10,769,842 B2
(45) Date of Patent: *Sep. 8, 2020

(54) COMPRESSED RAY DIRECTION DATA IN A RAY TRACING SYSTEM

(71) Applicant: Imagination Technologies Limited, Kings Langley (GB)

(72) Inventors: Luke T. Peterson, San Francisco, CA (US); Simon Fenney, St. Albans (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/375,648

(22) Filed: Apr. 4, 2019

(65) Prior Publication Data

US 2019/0236833 A1    Aug. 1, 2019

Related U.S. Application Data

(63) Continuation of application No. 15/622,315, filed on Jun. 14, 2017, now Pat. No. 10,290,143.

(51) Int. Cl.
*G06T 15/06* (2011.01)
*G06T 15/55* (2011.01)
(Continued)

(52) U.S. Cl.
CPC .............. *G06T 15/06* (2013.01); *G06T 9/00* (2013.01); *G06T 15/30* (2013.01); *G06T 15/55* (2013.01); *G06T 15/506* (2013.01)

(58) Field of Classification Search
None
See application file for complete search history.

(56) References Cited

U.S. PATENT DOCUMENTS 5,704,024 A    12/1997    Voorhies et al.
6,337,684 B1    1/2002    Dyer et al.
(Continued)

FOREIGN PATENT DOCUMENTS

GB    2391441 A    1/2006

OTHER PUBLICATIONS

Won-Jong Lee, Youngsam Shin, Jaedon Lee, Jin-Woo Kim, Jae-Ho Nah, Seokyoon Jung, Shihwa Lee, Hyun-Sang Park, Tack-Don Han, "SGRT: A Mobile GPU Architecture for Real-Time Ray Tracing", Jul. 21, 2013, ACM, HPG '13 Proceedings of the 5th High-Performance Graphics Conference, pp. 109-119.*

(Continued)

*Primary Examiner* — Robert Bader
(74) *Attorney, Agent, or Firm* — Potomac Law Group, PLLC; Vincent M DeLuca

(57) ABSTRACT

Ray tracing systems process rays through a 3D scene to determine intersections between rays and geometry in the scene, for rendering an image of the scene. Ray direction data for a ray can be compressed, e.g. into an octahedral vector format. The compressed ray direction data for a ray may be represented by two parameters (u,v) which indicate a point on the surface of an octahedron. In order to perform intersection testing on the ray, the ray direction data for the ray is unpacked to determine x, y and z components of a vector to a point on the surface of the octahedron. The unpacked ray direction vector is an unnormalised ray direction vector. Rather than normalising the ray direction vector, the intersection testing is performed on the unnormalised ray direction vector. This avoids the processing steps involved in normalising the ray direction vector.

16 Claims, 9 Drawing Sheets

(51) Int. Cl.
　　　*G06T 15/30*　　　(2011.01)
　　　*G06T 9/00*　　　　(2006.01)
　　　*G06T 15/50*　　　(2011.01)

(56) References Cited

U.S. PATENT DOCUMENTS

| | | |
|---|---|---|
| 6,489,955 B1 | 12/2002 | Newhall, Jr. |
| 2005/0044117 A1 | 4/2005 | Fenney et al. |
| 2010/0231589 A1 | 9/2010 | Salsbury et al. |

OTHER PUBLICATIONS

Steven G. Parker, Solomon Boulos, James Bigler, Austin Robison, "RTSL: a Ray Tracing Shading Language", Sep. 12, 2007, IEEE, IEEE/EG Symposium on Interactive Ray Tracing 2007, pp. 149-160.*

Eisenacher et al., "Sorted Deferred Shading for Production Path Tracing," Blackwell, Computer Graphics Forum, vol. 32, Issue 4, pp. 125-132, Jul. 2013.

Meyer et al., "On Floating-Point Normal Vectors," Eurographics Symposium on Rendering 2010, vol. 29, No. 4 (2011).

Tsakok, "Faster Incoherent Rays: Multi-BVH Ray Stream Tracing," ACM, HPG '09 Proceedings of the Conference on High Performance Graphics, pp. 151-158, Aug. 2009.

Voorhies et al., "Reflection Vector Shading Hardware," SIGGRAPH 94 Conference Proceedings, pp. 163-166, Jul. 24, 1994.

\* cited by examiner

COMPRESSED RAY DIRECTION DATA IN A RAY TRACING SYSTEM

CROSS-REFERENCE TO RELATED APPLICATIONS

This application is a continuation of copending application Ser. No. 15/622,315 filed Jun. 14, 2017, pursuant to 35 U.S.C. 120.

BACKGROUND

Ray tracing systems can be configured to render images from 3-D scene descriptions. The images can be photorealistic, or achieve other objectives. For example, animated movies can be produced using ray tracing systems. Ray tracing techniques mimic the natural interaction of light with objects, and sophisticated rendering features can naturally arise from ray tracing a 3-D scene. Ray tracing can be parallelized relatively easily on the pixel by pixel level also, because pixels generally are processed independently of each other. Ray tracing allows for realistic images to be rendered but often requires high levels of processing power and large working memories, such that ray tracing can be difficult to implement for rendering images in real-time (e.g. for use with gaming applications), particularly on devices which have tight constraints on silicon area, cost and power consumption, such as on mobile devices (e.g. smart phones, tablets, laptops, etc.).

A ray tracing system stores ray data for rays that are to be processed. The rays may be processed by performing intersection testing of the rays with geometry of a 3-D scene to be rendered. The geometry typically comprises primitives representing surfaces of objects in the scene. Primitives are often triangles defined by data at three vertices, but primitives may be other shapes such as other two dimensional polygons, nurbs, quadrilateral patches, or procedurally defined surfaces. A shader program may be executed in response to an intersection between a ray and a primitive. A shader program typically includes one or more shader instructions to be executed. Ray tracing systems can store ray data describing the rays to be processed in the scene. The ray data for a ray may include many different components describing different characteristics of the ray.

A ray may be represented as a vector. Typically, the ray data for a ray includes a ray origin which defines an origin of the ray in the 3D scene to be rendered, and a ray direction which defines the direction of the ray through the 3D scene. The ray origin and ray direction in the 3D scene may each be described with three components, such as x, y and z components. For example, each of these six components (i.e. x, y and z components for the ray origin and ray direction) may be represented with a 32-bit floating point number, but in other examples different formats and numbers of bits may be used for these components. Direction vectors are normalised (i.e. scaled such that the sum of the square of the components equals one, i.e. $x^2+y^2+z^2=1$) so that they purely represent direction with the magnitude of the normalised direction vectors equaling one.

Ray tracing systems may benefit from parallel processing of a large number of rays. Therefore, a large memory may be needed to store the ray data, which can be detrimental in terms of silicon area usage and cost of the ray tracing system.

Furthermore writing ray data into, and reading ray data from, a memory consumes power and time, so a large amount of ray data may result in increased power consumption and latency of the ray tracing system.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Octahedron-normal vectors have been used to represent surface normal vectors in a compressed format. Octahedron-normal vectors allow surface normals to be encoded by projecting the surface normal direction onto the surface of an octahedron, transforming the octahedron to form a square, and then defining the surface normals using two parameters (u,v) to describe a position within the square. Examples in the present disclosure extend the octahedron-normal vector format beyond use with surface normals, to use for representing ray directions of rays in a ray tracing system.

Furthermore, in examples described herein, when ray direction data has been compressed according to an octahedral vector format, the decompression of compressed ray direction data for use by a ray tracing system for intersection testing is simplified such that the ray direction data is not normalised. By avoiding normalising the ray direction data, fewer processing steps are performed in the ray tracing system, thereby decreasing the latency and power consumption of the ray tracing system. Since ray tracing systems process large numbers of rays (often millions or billions of rays for each image rendered), any reduction in latency and/or power consumption involved in the processing of a ray has a significant benefit to the ray tracing system. This is particularly useful when the ray tracing system is used to render images in real-time, e.g. on a device which has limited processing resources, size and cost (such as on mobile devices, e.g. a smart phone, or tablet).

In particular, there is provided a ray tracing system for use in rendering an image of a scene, the ray tracing system comprising:
  a memory configured to store ray data for a ray to be processed in the ray tracing system, wherein the ray data for the ray comprises ray direction data stored in a compressed format; and
  intersection testing logic configured to:
    construct an unnormalised ray direction vector for the ray by unpacking the compressed ray direction data for the ray; and
    perform intersection testing on the ray in the scene using the unnormalised ray direction vector for the ray;
  wherein the ray tracing system is configured to use results of the intersection testing for rendering the image of the scene.

The compressed format may for example be an octahedral vector format. In other examples, the compressed format may be a block-floating-point format (i.e. one shared exponent for all 3 components), an integer format (i.e. no exponent, but not reduced to 2 components, so all 3 (x,y,z) components are still needed), or a bundled ray format where multiple rays share some high order bits of their ray data.

There is also provided a ray tracing method for use in rendering an image of a scene, the ray tracing method comprising:

retrieving, from a memory, ray data for a ray to be processed, wherein the ray data for the ray comprises ray direction data stored in a compressed format (e.g. where the compressed format may be an octahedral vector format);

constructing an unnormalised ray direction vector for the ray by unpacking the compressed ray direction data for the ray;

performing intersection testing on the ray in the scene using the unnormalised ray direction vector for the ray; and using results of the intersection testing for rendering the image of the scene.

The intersection testing unit may make use of a clipping distance for the ray, wherein the clipping distance has been scaled by an amount based on the magnitude of the unnormalised ray direction vector. For example, the clipping distance of the ray (i.e. the clipping distance in the direction of the ray) may be scaled by transforming the clipping distance into Manhattan space.

The intersection testing logic may be configured to unpack the compressed ray direction data for the ray by determining three components representing a direction of the ray in the three-dimensional space of the scene.

The intersection testing logic may comprise a primitive intersection tester configured to perform intersection testing on the ray by identifying an intersection of the ray with a primitive in the scene. The intersection testing logic may comprise a box intersection tester configured to perform intersection testing on the ray by identifying an intersection of the ray with a bounding box of one or more primitives in the scene. The intersection testing logic may comprise a sphere intersection tester configured to perform intersection testing on the ray by identifying an intersection of the ray with a sphere representing the position of a portion of geometry in the scene.

The intersection testing logic may also comprise a triangle intersection tester capable of identifying intersections between the ray and one or more triangles in the scene. The intersection testing logic may further comprise programmable or dedicated logic for testing additional geometric primitives in the scene. The intersection testing logic may comprise any other suitable type of intersection tester.

The memory in which the ray data is stored may be a local on-chip memory, and may be considered to be a cache. As an example, the compressed ray direction data for a ray may be represented using 52 bits. In some examples, core ray data for the ray is stored in the local memory, whereas at least some non-core ray data for the ray is stored in a separate memory (e.g. system memory), wherein the compressed ray direction data is included in the core ray data for the ray.

There may also be provided a ray compression method comprising:

obtaining (e.g. receiving) ray direction data for a ray to be processed in a ray tracing system, the ray direction data comprising three components representing a direction of the ray in the three-dimensional space of a scene to be rendered;

compressing the ray direction data for the ray in accordance with an octahedral vector format which uses two parameters to reference a position on an octahedron to represent the ray direction; and storing the compressed ray direction data for the ray in a memory for subsequent use in performing intersection testing on the ray.

Similarly, there may be provided a ray compression module (e.g. implemented as a software module (e.g. as part of a shader program) to be executed on one or more execution units) for use in a ray tracing system, the ray compression module configured to:

obtain ray direction data for a ray to be processed in the ray tracing system, the ray direction data comprising three components representing a direction of the ray in the three-dimensional space of a scene to be rendered;

compress the ray direction data for the ray in accordance with an octahedral vector format which uses two parameters to reference a position on an octahedron to represent the ray direction; and cause the compressed ray direction data for the ray to be stored in a memory for subsequent use in performing intersection testing on the ray in the ray tracing system.

There may be provided a ray tracing system for use in rendering an image of a scene, the ray tracing system comprising:

a memory configured to store ray data for a ray to be processed in the ray tracing system, wherein the ray data for the ray comprises ray direction data stored in a compressed format (e.g. an octahedral vector format); and intersection testing logic configured to:
partially decompress the compressed ray direction data for the ray; and
perform intersection testing on the ray in the scene using the partially decompressed ray direction data for the ray;

wherein the ray tracing system is configured to use results of the intersection testing for rendering the image of the scene.

There is also provided a ray tracing method for use in rendering an image of a scene, the ray tracing method comprising:

retrieving, from a memory, ray data for a ray to be processed, wherein the ray data for the ray comprises ray direction data stored in a compressed format (e.g. where the compressed format may be an octahedral vector format);

partially decompressing the compressed ray direction data for the ray;

performing intersection testing on the ray in the scene using the partially decompressed ray direction data for the ray; and using results of the intersection testing for rendering the image of the scene.

In some examples there is provided a method of processing data in a ray tracing system, the method comprising:

executing a shader program which outputs a ray for intersection testing;

compressing ray direction data for the ray;

storing the compressed ray direction data; and performing intersection testing on the ray without fully decompressing the compressed ray direction data, wherein the ray tracing system is configured to use results of the intersection testing for rendering the image of the scene.

There may be provided a ray tracing system for use in rendering an image of a scene, the ray tracing system comprising:

one or more execution units configured to execute shader instructions which output a ray for intersection testing;

a ray compression module configured to compress ray direction data for the ray;

a ray data store (e.g. a ray memory) configured to store the compressed ray direction data; and intersection testing logic configured to perform intersection testing on the ray without fully decompressing the compressed ray direction data, wherein the ray tracing system is configured to use results of the intersection testing for rendering the image of the scene.

The ray compression module may be implemented as a software module (e.g. executed on the one or more execution units). Alternatively, the ray compression module may be implemented as a dedicated hardware module (e.g. implemented in fixed-function circuitry).

The compressed ray direction data for the ray may be stored in the ray data store with other ray data for the ray, such as the ray origin and clipping distance (e.g. where the clipping distance may or may not be scaled). The intersection testing logic may be configured to receive ray data including the compressed ray direction data from the ray data store.

Performing the intersection testing on the ray without fully decompressing the ray direction data may involve using the compressed ray direction data in the intersection testing or may involve partially decompressing the compressed ray direction data and then using the partially decompressed ray direction data in the intersection testing. There are some compression formats (e.g. an integer format) which do not discard a component of the ray direction and therefore the compressed ray direction data can be used for performing intersection testing without any intervening decompression. However, other compression formats (e.g. an octahedral vector format) do discard a component of the ray direction, so the compressed ray direction data is partially decompressed by reconstructing the discarded component (but no renormalisation is necessary) for the purposes of performing intersection testing.

The results of the intersection testing may be used by a shader program. For example, the ray direction data may be fully decompressed for use by the shader program.

The compression and full decompression of the ray direction data may be performed by a shader program executing on the one or more execution units. A shader program comprises one or more shader instructions to be executed.

For a given ray, intersection testing is performed many more times than initial shading (which generates the ray) or result shading (which processes the ray following intersection testing). For example, intersection testing may be performed dozens to hundreds of times more often than shading is performed for a ray. This is because a ray is typically intersection tested against many nodes at multiple levels of an acceleration structure, and also intersection tested against many primitives. Therefore, being able to perform the intersection testing on a ray without fully decompressing the ray direction data reduces the processing involved in performing intersection tests many times. Therefore, a significant overall reduction in processing is achieved by performing the intersection testing on a ray without fully decompressing the ray direction data.

There may also be provided a ray tracing system configured to perform any of the methods described herein. The ray tracing systems described herein may be embodied in hardware on an integrated circuit. There may be provided a method of manufacturing, at an integrated circuit manufacturing system, a ray tracing system. There may be provided an integrated circuit definition dataset that, when processed in an integrated circuit manufacturing system, configures the integrated circuit manufacturing system to manufacture a ray tracing system as described herein. There may be provided a non-transitory computer readable storage medium having stored thereon a computer readable description of an integrated circuit that, when processed in an integrated circuit manufacturing system, causes the integrated circuit manufacturing system to manufacture a ray tracing system as described herein.

In particular, there may be provided an integrated circuit manufacturing system comprising:

a non-transitory computer readable storage medium having stored thereon a computer readable description of an integrated circuit that describes a ray tracing system as described herein;

a layout processing system configured to process the integrated circuit description so as to generate a circuit layout description of an integrated circuit embodying the ray tracing system; and an integrated circuit generation system configured to manufacture the ray tracing system according to the circuit layout description.

There may be provided computer readable code configured to cause the any of the methods described herein to be performed when the code is run. The computer readable code may be stored on a non-transitory computer readable storage medium.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
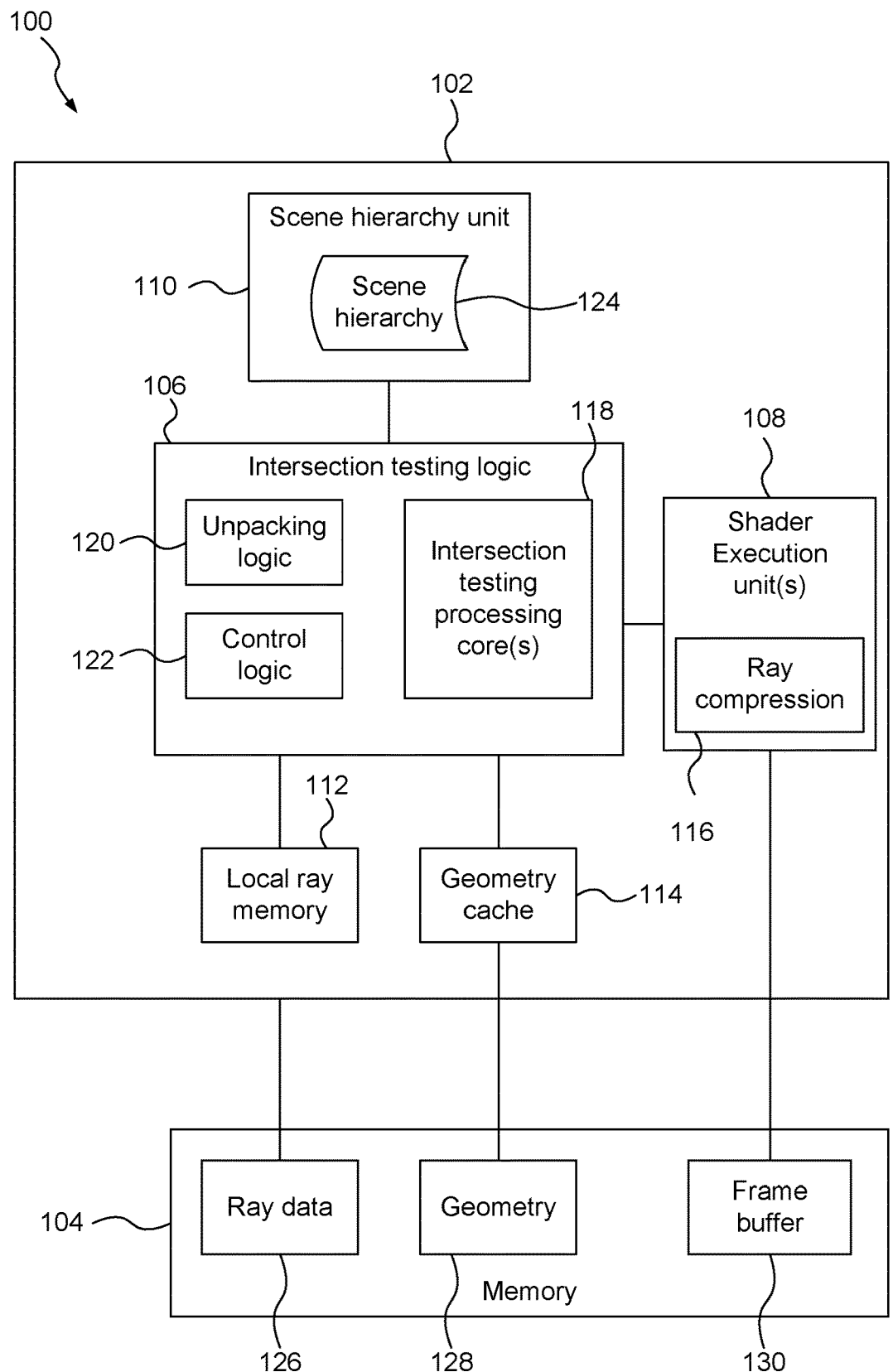
FIG. 1 shows a ray tracing system.

The accompanying drawings illustrate various examples. The skilled person will appreciate that the illustrated element boundaries (e.g., boxes, groups of boxes, or other shapes) in the drawings represent one example of the boundaries. It may be that in some examples, one element

DETAILED DESCRIPTION

The following description is presented by way of example to enable a person skilled in the art to make and use the invention. The present invention is not limited to the embodiments described herein and various modifications to the disclosed embodiments will be apparent to those skilled in the art.

Embodiments will now be described by way of example only.

FIG. 1 shows a ray tracing system 100 which comprises a ray tracing unit 102 and a memory 104. The ray tracing unit 102 comprises a number of components for processing rays in a scene for rendering an image of the scene. For example, the ray tracing unit 102 comprises intersection testing logic 106, one or more execution units 108, a scene hierarchy unit 110, a ray memory 112, a geometry cache 114 and a ray compression module 116. In the example shown in FIG. 1 the memory 104 is shown as separate to the ray tracing unit 102, but in other examples the memory 104 could be integrated into the ray tracing unit 102.

The intersection testing logic 106 (and the components thereof) may be implemented in hardware, software, firmware or any combination thereof. For example, the intersection testing logic 106 includes one or more intersection testing processing cores 118 configured to perform intersection testing on rays in a scene. The intersection testing processing cores 118 may be implemented in dedicated fixed function hardware, which allows the intersection testing to be performed efficiently. However, it would be possible to implement the intersection testing as software running on more general purpose processing hardware. The intersection testing logic 106 also comprises unpacking logic 120 and control logic 122. The control logic 122 is configured to control the operation of the intersection testing logic 106. As described in more detail below, the unpacking logic 120 is configured to unpack compressed ray direction data.

The shader execution units 108 are configured to execute shader programs (which may be referred to herein simply as "shaders") to determine effects of intersections of rays with geometry in the scene. For example, when the intersection testing logic 106 identifies an intersection of a ray with a primitive then an indication of this intersection is passed to the shader execution units 108, thereby invoking the execution of a shader program for the intersection. The shader program may determine a colour of a pixel (or a contribution to the colour of the pixel) in an image being rendered. The shader program may also output more rays to be intersection tested by the intersection testing logic 106. Precise details of the shader execution are beyond the scope of this disclosure.

The scene hierarchy unit 110 is configured to determine a scene hierarchy 124 (which may be referred to as an "acceleration structure"). The scene hierarchy unit 110 may be implemented in hardware, software, firmware or any combination thereof. The scene hierarchy unit 110 receives primitives describing objects in the scene to be rendered, and determines a hierarchical acceleration structure 124 which describes the positions of the primitives in the scene, e.g. in a manner that can improve the efficiency of the intersection testing. The acceleration structure 124 may comprise a plurality of linked nodes, where each node can represent a portion of the scene space. Nodes may for example be bounding boxes of sets of one or more primitives. In other examples, nodes may be spheres representing the position of a portion of geometry in the scene. The intersection testing logic 106 can perform intersection testing of rays against the nodes of the scene hierarchy 124. Precise details of the operation of the scene hierarchy unit 110 are beyond the scope of this disclosure.

The memory 104 comprises a ray data memory 126, a geometry memory 128 and a frame buffer 130. The memory 104 may be implemented as a single block of memory or as a plurality of separate blocks of memory. The memory 104 may be implemented as system memory, whereby data can pass between the memory 104 and the ray tracing unit 102 over a communications bus (e.g. a system bus).

The ray data memory 126 is configured to store at least some ray data relating to rays to be processed by the ray tracing unit 102. The ray memory 112 is part of the ray tracing unit 102 (e.g. it is implemented "on-chip" with the ray tracing unit 102, and may be referred to as a "local ray memory") and is used to store at least some ray data relating to rays to be processed by the ray tracing unit 102. The local ray memory 112 may act as a cache for the ray data which is passed between the ray tracing unit 102 and the ray data memory 126. However, in some examples, the local ray memory 112 may store some types of ray data for rays (e.g. "core" ray data, such as the ray direction and ray origin and clipping distance), whilst other types of ray data for rays may be stored in the ray data memory 126. Core ray data may be the data relating to a ray which is used to perform intersection tests on the ray, whereas non-core ray data may be other data relating to a ray, such as data (e.g. texture data) which may be used by a shader program which is executed in response to an intersection of a ray with geometry in the scene.

The ray compression module 116 is described in more detail below and is configured to compress ray direction data according to examples described herein. In the example shown in FIG. 1, the ray compression module 116 is shown within the shader execution unit(s) 108. The ray compression module 116 may be implemented as a software module (e.g. as part of a shader program) or as a hardware module (e.g. as fixed function circuitry) for performing the compression of the ray direction data as described herein. In other examples, the ray compression module may be implemented separately to the shader execution unit(s) 108, e.g. in dedicated hardware, as part of the ray tracing unit 102.

The geometry memory 128 is configured to store geometry data (e.g. primitive data) describing geometry in the scene to be rendered. The geometry cache 114 is used to cache geometry data which is passed between the ray tracing unit 102 and the geometry data memory 128. The frame buffer 130 is configured to store rendered pixel values, e.g. pixel values output from the shader execution units 108. For clarity, FIG. 1 is a simplified representation of a ray tracing system, and it should be apparent that the ray tracing unit 102 may include other processing blocks which are not shown in FIG. 1.

Figure 2:
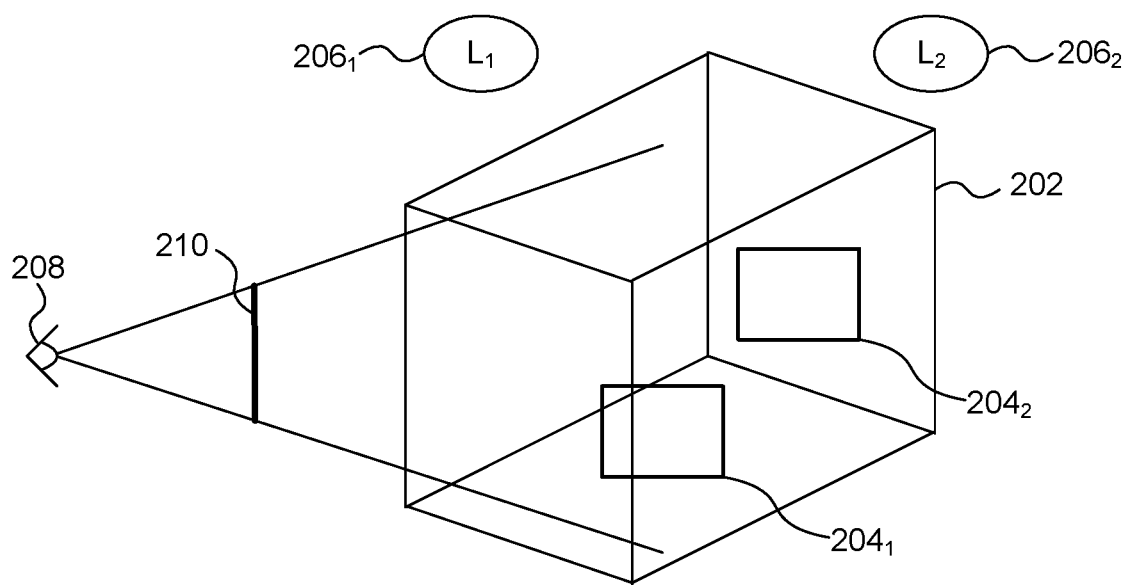
FIG. 2 shows a scene to be rendered from a viewpoint.

FIG. 2 shows an example of a scene 202 which includes two surfaces 2041 and 2042. This is a very simple example, and in other examples there would likely be many more surfaces and objects within the scene. FIG. 2 shows two light sources 2061 and 2062 which illuminate objects in the scene. The viewpoint from which the scene is viewed is shown at 208 and the view plane of the frame to be rendered is represented at 210. One or more rays can be traced through each pixel position of the view plane 210 and into the scene 202 to identify intersections with primitives in the scene (e.g. surfaces 2041 or 2042). Shaders are invoked as a result of the intersections and the shaders are executed by the execution unit(s) 108 to determine the pixel values of the rendered image.

The ray data describing a ray includes many fields, such as: ray origin data which defines an origin for the ray in 3D scene space; ray direction data which defines a direction of the ray as a vector through the 3D scene space; a clipping distance for the ray which defines a maximum distance to trace the ray to test for intersections before stopping the tracing of the ray; and other ray data which may be different in different examples. For example, the ray origin data may comprise three coordinates (e.g. x, y and z component coordinates) to represent a position in scene space. Each of the x, y and z components may for example be represented as a single-precision floating point number (therefore using 32 bits). In other examples, different formats may be used for the ray origin data.

Figure 3:
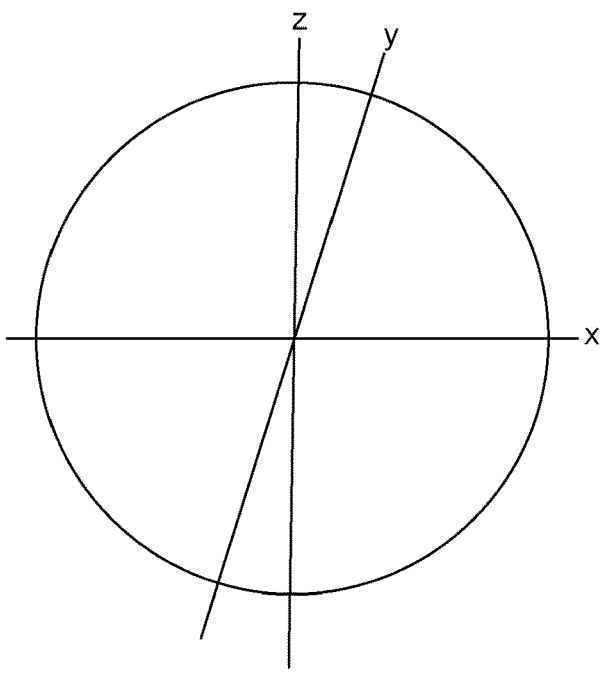
FIG. 3 represents a unit sphere in Cartesian coordinates.

In prior art systems, the ray direction data may be represented with three Cartesian coordinates (e.g. x, y and z component coordinates) to represent a position in scene space in a similar format as the ray origin data, e.g. with three single-precision floating point numbers. FIG. 3 represents a sphere with a unit radius (R=1), centred at the origin of x, y and z axes. Ray directions can be conceptualized as points on the surface of the sphere.

Because the ray's direction vector is defined as having unit length, there is an opportunity to compress the data needed to represent the vector. A trivial compression format is to discard one of the 3 components, and reconstruct it when needed using the Pythagorean theorem. This provides a data size savings of one third at the expense of a computational cost that includes a square root calculation.

If a floating point format is used for the components of the ray direction then the sampling density of the representable directions varies across the surface of the sphere. Due to the inherent non-uniform nature of floating point numbers, the highest density of representable directions is found close to the axes, whilst the lowest density of representable directions is found away from the axes, e.g. the lowest density of representable directions is found close to the diagonals given by $x=y=z$, $x=y=-z$, $x=-y=z$ and $-x=y=z$. The density of representable ray directions corresponds to the accuracy with which ray directions can be represented. The ray directions can only be relied upon to be as accurate as the lowest accuracy, e.g. because simple operations such as camera transformations may result in a ray direction which is representable along a diagonal in the x,y,z coordinates of the scene space.

This loss of precision is further compounded if one of the components is discarded. In this naïve format, the representable precision further degrades as vectors near the cardinal axis affected by the discarded component.

Another representation for a ray's direction vector is polar coordinates. Polar coordinates also have the advantage of being composed from two components, but they share the disadvantage of increased density of representable directions as the direction approaches the poles, and decreased density as the direction approaches the equator.

An octahedral vector format is used for the ray direction data in some examples described herein. The octahedral vector format provides a more uniform distribution of representable ray directions than can be provided with a floating point format. This means that the number of bits required to represent the ray direction of a ray can be reduced compared to using a floating point format. Furthermore, octahedral normal vectors can be inexpensively converted to and from 3-component Cartesian vectors.

An octahedral vector format has been used to represent surface normal directions, and has been referred to as an octahedron normal vector format. Details of the octahedron normal vector format for use in representing surface normals are described in a paper by Quirin Meyer, Jochen Süßmuth, Gerd Sußner, Marc Stamminger and Günther Greiner entitled "On Floating-Point Normal Vector", Eurographics Symposium on Rendering 2010, Volume 29 (2010), Number 4. Furthermore, UK patent number GB2391441 describes the use of an octahedral vector format for compressed bump maps.

Figure 4A:
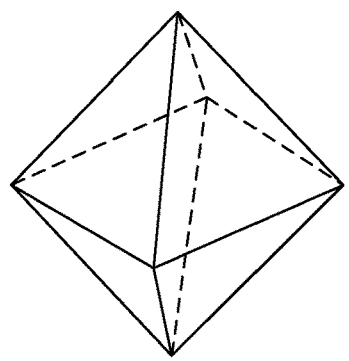
FIG. 4a represents an octahedron.
Figure 4B:
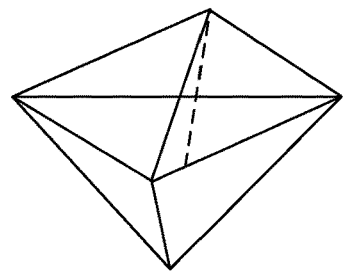
FIG. 4b represents an intermediate transformed state of an octahedron in which the upper half of the octahedron is projected down to the central plane.
Figure 4C:
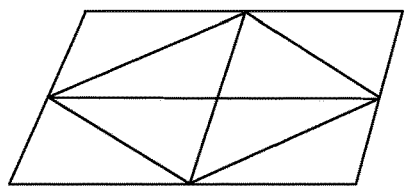
FIG. 4c represents a transformed octahedron in which the quarters of the lower half of the octahedron are transformed up to the central plane and folded outwards.
Figure 4D:
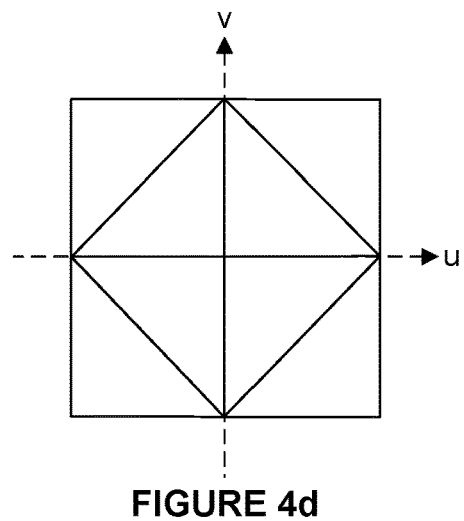
FIG. 4d shows the transformed octahedron as a 2D representation from a top-view.

Ray direction vectors defined in x, y and z coordinates as points on the surface of a unit sphere can be converted into an octahedral vector format. The first step of this conversion is to normalise the ray direction vectors using the L1-norm. This can be thought of as normalising a sphere in Manhattan space. In this way the ray direction vectors are projected onto a regular octahedron which is centred on the origin, wherein each of the corners of the octahedron are located on one of the x, y or z axes. FIG. 4a depicts such an octahedron. The next step of the conversion is to unwrap the octahedron into a square in two dimensions. This unwrapping process is illustrated in FIGS. 4b to 4d. The top half of the octahedron (i.e. the half of the octahedron with positive z values) is projected down to the plane at z=0, the result of which is shown in FIG. 4b. To do this the x and y values are left unchanged but the z value is set to zero for any point on the octahedron with a positive z value. The bottom half of the octahedron (i.e. the half of the octahedron with negative z values) is projected up to the plane at z=0 and the four triangular sections in the four quadrants in the plane are folded outwards, the result of which is shown in FIG. 4c. To do this the z value is set to zero for any point on the octahedron with a negative z value, and the x and y values are shifted to x' and y' values wherein if x and y are both positive then x'=1−y and y'=1−x; if x is positive and y is negative then x'=−1−y and y'=1−x; if x is negative and y is positive then x'=1−y and y'=−1−x; and if x and y are both negative then x'=−1−y and y'=−1−x. FIG. 4d shows the unfolded octahedron as a 2D representation, where positions in the plane can be represented using parameters u and v, which represent x and y for x+y≤1 and which represent x' and y' for x+y≥1. The values of u and v are bound to be in the ranges −1≤u≤1 and −1≤v≤1. Values of u or v outside of these ranges do not represent positions on the surface of the octahedron. The unwrapping of the octahedron is described above in two steps, but this is just for clarity of explanation, and it should be apparent that the unwrapping can be applied in a single conversion step.

Octahedral vectors allow ray directions to be encoded by projecting the ray direction onto the surface of an octahedron, folding (or "unwrapping") the octahedron to form a square, and then defining the ray directions using two parameters (u,v) to describe a position within the square, such that the two parameters (u,v) reference a position on the octahedron. Octahedral vectors provide a substantially uniform distribution of representable ray directions (unlike floating point representations of direction). The octahedral vector format can use 52 bits to represent a ray direction with the same accuracy as could be achieved with 96 bits if the ray direction was represented by three 32-bit floating point numbers giving x, y and z components of the ray direction.

Figure 5:
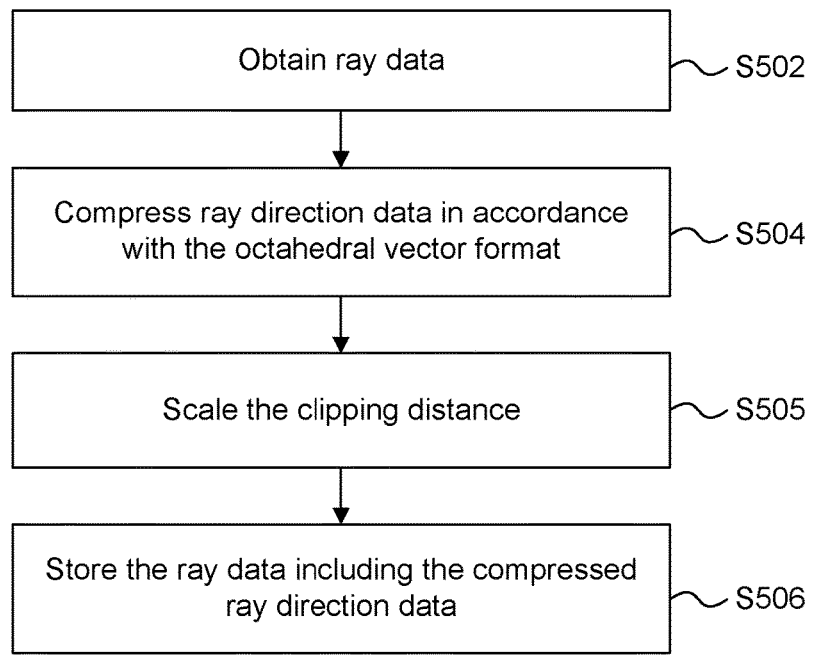
FIG. 5 shows a flowchart for a method of compressing ray data.

FIG. 5 shows a flow chart for a method of compressing ray direction data. The method can be implemented by the ray compression module 116 in hardware (e.g. fixed function circuitry), software, firmware or any combination thereof. In the example shown in FIG. 1 the ray compression module 116 is included within the shader execution unit(s) 108 (e.g. the ray compression module 116 may be implemented as part of a shader program executed by the shader execution unit(s) 108, but in other examples, the ray compression module 116 could be implemented as a separate unit in the ray tracing unit 102 or implemented within another unit (e.g. within the intersection testing logic 106 or the local ray memory 112.

In step S502 ray data for a ray is obtained (i.e. received) at the ray compression module 116. In particular, ray direction data for a ray to be processed in the ray tracing unit 102 is obtained at the ray compression module 116. Other components of ray data for the ray (e.g. the ray origin, etc.) may, or may not, be received at the ray compression module 116. The ray compression module 116 is arranged to compress the ray direction data for the ray. The ray direction data received at the ray compression module 116 comprises three components (x, y and z components) representing the direction of the ray in the 3D scene.

In step S504 the ray compression module 116 compresses the ray direction data in accordance with the octahedral vector format, as described above. Therefore, the two parameters (u and v) are determined from the x, y and z components of the ray direction vector, wherein the u and v parameters reference a position on the octahedron to represent the ray direction. In summary of the above explanation, the parameters are determined as:

$$[u, v]^T = \begin{cases} [x, y]^T, & \text{if } z \geq 0 \\ [\sigma(y) - y, \sigma(x) - x]^T, & \text{if } z < 0 \end{cases} \quad (1)$$

where $$\sigma(t) = \begin{cases} 1, & \text{if } t \geq 0 \\ -1, & \text{if } t < 0 \end{cases} \quad (2)$$

As described above, in some examples, the ray compression module 116 is implemented in software as part of a program (a "shader program") which is executed on the execution unit(s) 108. In these examples the ray direction data is not outputted from the execution unit(s) 108 in a format including three components (x, y and z components), and instead the ray direction data is outputted from the execution unit(s) 108 having been compressed (e.g. into the octahedral vector format). In other words, a shader program (executing on the execution core(s) 108 generates compressed ray direction data immediately as the ray is outputted from the shader. For example, this could be done with a shader instruction or set of instructions. In some examples, there may be some intermediate buffering of uncompressed ray direction data before it is compressed because the write instructions from the shader might not output all of the data simultaneously in order to allow compression to occur. The intermediate buffering may be kept small to avoid the need for a large memory for storing ray direction data that is ready to be compressed. In the examples in which a shader program performs the compression of the ray direction data, the compressed ray direction data may be the authoritative copy of the ray direction data. It may the case that there is no additional memory in the ray tracing unit 102 storing the uncompressed ray direction data. It is noted that there may be additional memory in the ray tracing unit 102 to store non-direction ray attributes.

However, in some other examples, a shader program which is executed on the execution core(s) 108 may output uncompressed ray direction data to a memory (e.g. a memory within the ray tracing unit 102), and a ray compression module implemented within the ray tracing unit 102 (e.g. externally to the execution core(s) 108) may receive the ray direction data from the memory and compress the ray direction data before storing the compressed ray direction data in the local ray memory 112.

In summary of the two preceding paragraphs, three distinct implementations are described and there may also be variations between them that incorporate different elements from each. The three implementations are:

1. In a first implementation a shader instruction, or combination of instructions, (e.g. a "SetRayDirection" instruction) takes immediate arguments specifying a direction, and on execution performs the compression immediately and stores the compressed value to ray memory. This is the most efficient implementation, but it breaks an expected programming paradigm of allowing component-wise assignment (e.g. treating ray.direction as a vec3, and being able to assign ray.direction.x in a separate statement from assigning ray.direction.y).

2. In a second implementation (a "half-way" implementation) a temporary memory is used to store results from the shader. The temporary memory is on-chip memory, and may be directly coupled to the execution units which execute the shader instructions. The shader instructions can operate in a normal manner, e.g. with ray.direction as a vec3. After the shader execution has completed (or after the ray has been made immutable and can no longer be affected by the shader), the temporary vec3 is then compressed and written into ray memory.

3. In a third implementation, two formats of rays are allowed: one with compressed vectors and one without compressed vectors. In this implementation, the shader writes the uncompressed forms, then compressor logic compresses the rays in the process of transitioning the rays from shading to intersection testing. This implementation is often not as efficient as the first two implementations (e.g. in terms of latency and silicon area), but it would be appropriate if there was a looser coupling between shading and intersection testing.

In step S505 the ray compression module 116 scales the clipping distance (t) of the ray based on the magnitude of the unnormalised ray direction vector, i.e. based on the magnitude of the ray direction vector when it has been projected onto the regular octahedron which is centred on the origin, as shown in FIG. 4a. As described in more detail below, the scaled clipping distance can be used in the intersection testing to determine when to clip the ray. For example, the clipping distance may be scaled by multiplying the original clipping distance of the ray by the magnitude of the unnormalised ray direction vector. As described above, the unnormalised ray direction vector can be considered to be in Manhattan space, so the scaling of the clipping distance can be performed by transforming the clipping distance for the ray, based on the ray's direction, to also be in Manhattan space. The scaling of the clipping distance can be implemented by a shader program executing on the execution unit(s) 108. It is noted that step S505 is an optional step. In other words, although scaling the clipping distance is beneficial for the intersection testing that is performed on the ray, it is not essential to scale the clipping distance. Furthermore, in some examples, it would be possible for the scaling of the clipping distance to be performed when the ray direction data is decompressed, rather than when the ray direction data is compressed as described above. However, it may be more beneficial to scale the clipping distance during compression of the ray direction data, so that the amount of processing performed on decompression is reduced. Rays may be processed for intersection testing multiple times (e.g. tested against different nodes of an acceleration structure or against geometry in the scene) using the compressed ray data, so it can be useful to avoid the need to scale the clipping distance as part of the decompression process for use in intersection testing.

In step S506 the ray data for the ray, including the compressed ray direction data and optionally the scaled clipping distance, is stored in a memory (e.g. the local ray memory 112 and/or the ray data memory 126). The compressed ray data can be stored for subsequent use in the ray tracing system 100, e.g. for intersection testing. In some examples, all of the fields of the ray data for a ray are stored together, e.g. in the local ray memory 112 and/or the ray data memory 126. In some other examples, some fields of the ray data for a ray (e.g. the "core" ray data for the ray) are stored in the local ray memory 112, whereas at least some other fields of the ray data for the ray (e.g. the "non-core" ray data for the ray) are stored in the ray data memory 126. The core ray data for a ray may for example include the ray origin data, the compressed ray direction data and the ray clipping distance, and may include further fields of data for the ray. The non-core ray data for the ray may include other data for the ray, such as indications of shaders to execute in response to an intersection involving the ray, or user-specified data, etc. For example, the core ray data may be the type of data which will always be used in the ray tracing system, i.e. data that is fundamental to the ability of the ray tracing system to process the ray correctly; whereas the non-core ray data may be the type of data which can vary depending upon the implementation of the ray tracing system and which may provide flexibility in the way in which rays are processed in the ray tracing system.

In some examples, a separate transient cache may be implemented in the ray tracing unit 102 for storing uncompressed ray data, and a ray compression module may be implemented that compresses the ray data as-needed. The uncompressed ray data is received at the cache from an external store.

Full decompression of the compressed ray direction data includes two steps: (i) unpacking the octahedral parameters into x, y and z components representing a position on the surface of the octahedron, and (ii) normalising the direction to place the vector back onto the surface of a unit sphere. For example, the u and v parameters of the octahedral direction vector can be unpacked to form the (unnormalised) x, y and z components on the octahedron according to the equations:

$$z = 1 - |u| - |v| \quad (3)$$

$$[x, y]^T = \begin{cases} [u, v]^T, & \text{if } z \geq 0 \\ [\sigma(v) - v, \sigma(u) - u]^T, & \text{if } z < 0 \end{cases}$$

Then, the unnormalised x, y and z components can be normalised using the L2 norm (or "Euclidean norm") to determine a normalised ray direction, represented by vectors to the surface of a unit sphere. It is noted that the unnormalised ray direction vector, defined by the unnormalised x, y and z components, is "unnormalised" in Euclidean space (which is the standard interpretation of the space in which a vector may be considered to be normalised), and this is how the term "unnormalised" is used herein. For the ray direction vectors to be normalised in Euclidean space then the magnitude of the ray direction vectors would be isotropic and would equal one in every direction, i.e. $\sqrt{x^2+y^2+z^2}=1$ for every ray direction. This is not the case for the unnormalised ray direction vectors obtained according to equations 3, given above. However, the "unnormalised" ray direction vectors could be considered to be "normalised" in Manhattan space (or "taxicab" space) because the unnormalised ray direction vectors are on the surface of the octahedron and therefore satisfy the equation $|x|+|y|+|z|=1$ for every ray direction.

Figure 6:
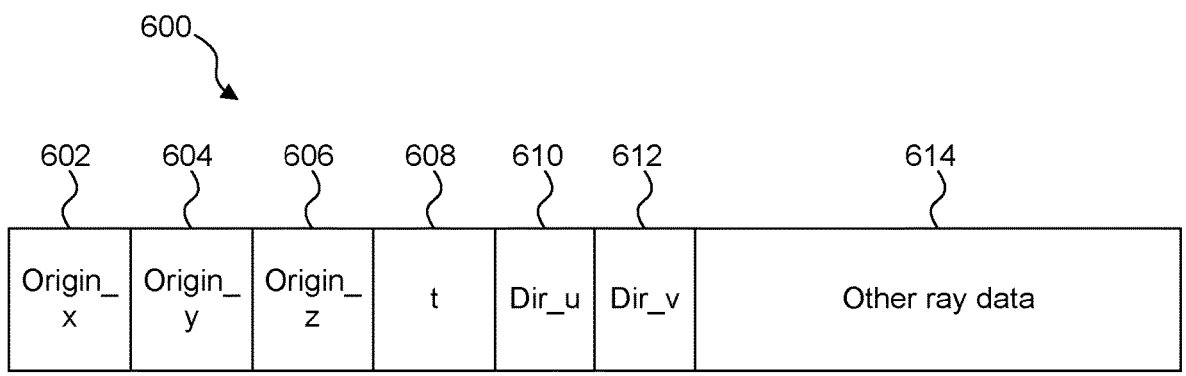
FIG. 6 shows a format of ray data for a ray.

FIG. 6 shows fields of the ray data 600 for a ray which may be stored. The ray data 600 comprises three components (602, 604 and 606) to represent the x, y and z coordinates of the ray origin. Each of these components may be represented as a 32-bit floating point number. The ray data 600 further comprises a clipping distance (t) 608 which indicates a maximum distance from the ray origin for which intersection testing is to be performed on the ray before the ray is clipped. This clipping distance 608 may be the scaled clipping distance determined in step S505. The clipping distance may for example be represented as a 32-bit floating point number. The ray data 600 further comprises two octahedral parameters (610 and 612) to represent the ray direction in octahedral vector format. As described above, the two parameters 610 and 612 may collectively be represented with 52 bits (e.g. each parameter may be represented with 26 bits) and still provide ray directions with an accuracy that is as good as using three components (x, y and z components) each represented with 32-bit floating point numbers. The ray data 600 may comprise other ray data 614 such as an indication of one or more shader programs to execute in response to intersections, or any other data that may be useful for processing the ray. The data that is included in the other ray data field 614 may be different in different examples, and the size of the other ray data field 614 may be different in different examples.

As described above, the use of an octahedral vector format can compress the ray direction data so that it is represented with 52 bits rather than 96 bits, thereby reducing the amount of ray data for a ray by 44 bits. Since the ray tracing system 102 is able to process millions or even billions of rays for each frame that is rendered, where frames can be rendered in real-time (e.g. at tens of frames per second), the number of rays that are processed per second is vast. Therefore, a reduction of 44 bits per ray that is stored can significantly reduce the amount of data that passes into and out of memories (e.g. the local ray memory 112 and the ray data memory 126). This can help to reduce the physical size (i.e. silicon area) of the ray tracing unit 102, and reduce the processing power and latency involved in processing ray data in the ray tracing unit 102 and involved in writing ray data to the memory or reading ray data from the memory.

Figure 7:
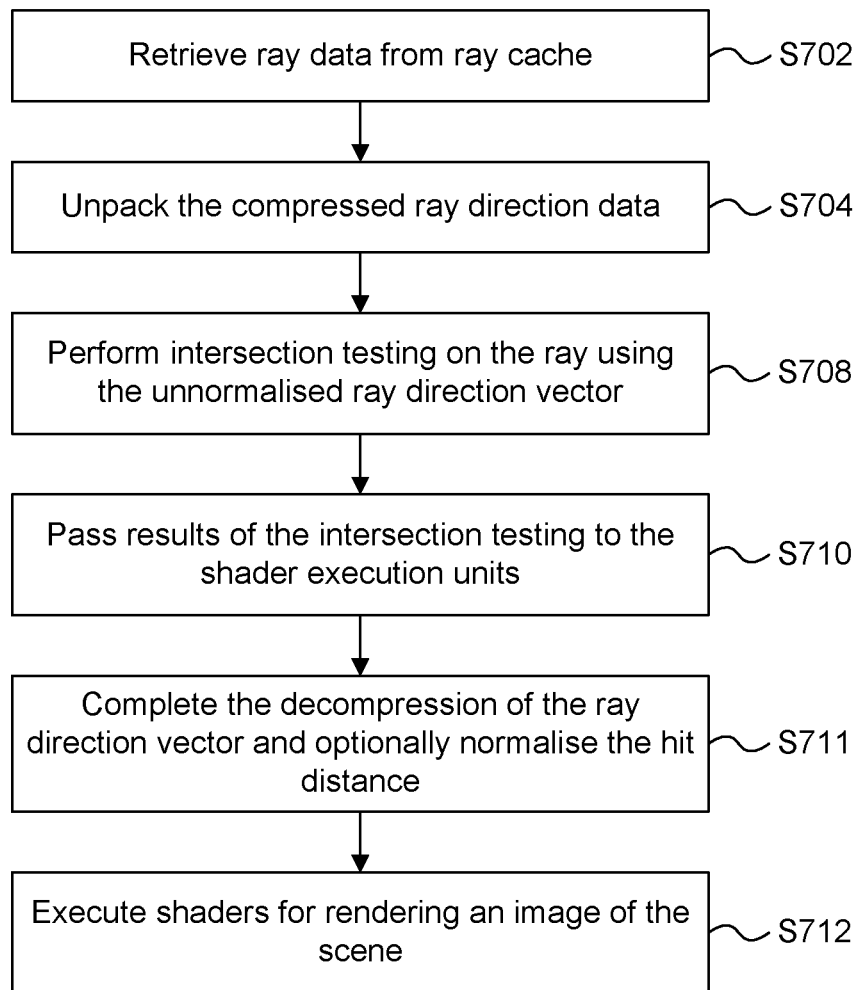
FIG. 7 shows a flowchart for a ray tracing method for use in rendering an image of a scene.

FIG. 7 shows a flowchart for a method of processing a ray in the ray tracing system 100. It is noted that the method may be applied to a plurality of rays, but for simplicity of description, FIG. 7 is described with reference to processing a ray. In step S702 the intersection testing logic 106 receives ray data from the local ray memory 112 for a ray that is to be intersection tested against geometry in the scene. The ray data includes the ray direction data compressed (e.g. in the octahedral vector format), and includes a clipping distance for the ray which may be scaled as a result of step S505. The intersection testing logic 106 also receives data describing the position of geometry in the scene, which may for example involve receiving primitive data from the geometry cache 114 or receiving the scene hierarchy 124 from the scene hierarchy unit 110.

In step S704 the unpacking logic 120 unpacks the compressed ray direction data for the ray. As described above, the unpacking of the compressed ray direction data involves determining three components (x, y and z components) of a vector representing the direction of the ray in the 3D scene space. In particular, the unpacking of the compressed ray direction data can be performed in accordance with equations (3) in order to determine unnormalised x, y and z components (representing a point on the surface of the octahedron). In this way the unpacking logic 120 of the intersection testing logic 106 constructs an unnormalised ray direction vector for the ray. Step S704 can be considered to be partially decompressing the ray direction data. The ray direction data is not fully decompressed in step S704 because the unpacked x, y and z components are unnormalised.

As described above in relation to step S505, the clipping distance (t) of the ray may have been scaled based on the magnitude of the unnormalised ray direction vector. The scaled clipping distance can be used in the intersection testing to determine when to clip the ray.

It is noted that in some examples the clipping distance is not scaled, and the intersection testing can be performed using an inappropriately scaled clipping distance. This may cause a slight inefficiency in the intersection testing, but will not result in rendering errors, so this is an acceptable implementation which avoids the step of scaling the clipping distance.

In step S708 the intersection testing processing core(s) 118 of the intersection testing logic 106 performs intersection testing on the ray in the scene using the unnormalised ray direction vector for the ray. Therefore, the unpacked ray direction components are not normalised for the purposes of performing intersection testing on the ray. In other words, the intersection testing is performed on rays with unnormalised ray direction vectors. The direction of the unnormalised ray direction vector would not be altered by normalising the ray direction vector (although the magnitude would be altered), so the algorithms used by the intersection testing processing core(s) 118 do not need to be altered when using unnormalised ray direction vectors and they still give the right answers in terms of whether a ray hits or misses a piece of geometry in the scene.

The scaling of the clipping distance takes account of the fact that the ray direction vector is unnormalised, such that the intersection testing performed on the ray using the unnormalised ray direction vector and the scaled clipping distance provides the same results as if the intersection testing was performed on the ray using a normalised ray direction vector and an unscaled clipping distance.

When ray direction data has been compressed according to an octahedral vector format, the decompression of the compressed ray direction data for use by a ray tracing system for intersection testing is simplified in examples described herein such that the ray direction data is not normalised. In other words, the ray direction data is partially decompressed, not fully decompressed, for the purposes of intersection testing. By avoiding performing the processes involved in normalising the ray direction data, fewer processing steps are performed in the ray tracing system, thereby decreasing the latency and power consumption of the ray tracing system.

When an intersection tester finds an intersection between a ray and an object in the scene (i.e. a "hit") it can record the hit distance, i.e. the distance within the scene from the origin of the ray to the intersection point. When the intersection tester is using an unnormalised ray direction vector, the hit distance may be determined in this "unnormalized" space. The unnormalised hit distance can be provided to a shader program that processes the intersection testing result. If the processing performed by the shader program is dependent upon the hit distance, then the shader program may normalise the hit distance so that it can process the intersection result correctly. In some examples, when an intersection between a ray and an object is found, the hit distance replaces the clipping distance for the ray. This is an optimisation which means that when the ray is tested against other nodes or other geometry in the scene, intersection tests do not need to be performed for ray distances further than the already-found closest hit.

The intersection testing processing core(s) 118 may be configured to perform intersection tests for elements of an acceleration structure as well as intersectable base primitives. The intersection testing processing core(s) 118 may be configured to perform intersection testing using unnormalised ray direction vectors.

The intersection testing processing core(s) 118 may implement a primitive intersection tester which receives geometry data (e.g. from the geometry cache 114) describing the positions of primitives in the scene and performs intersection testing of rays against the primitives. For example, in examples in which the primitives are triangles, the primitive intersection tester may be a triangle intersection tester which performs intersection testing of rays against triangles. In this way, the intersection testing logic 106 may be considered to comprise a primitive intersection tester configured to perform intersection testing on the ray by identifying an intersection of the ray with a primitive in the scene.

Figure 8A:
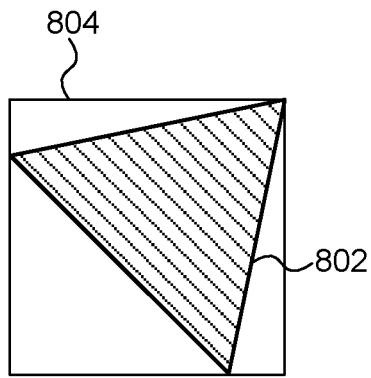
FIG. 8a shows a bounding box for a primitive.

The intersection testing processing core(s) 118 may implement a box intersection tester which performs intersection testing of rays against bounding boxes of geometry in the scene. A bounding box could be a bounding box of a single primitive, or a bounding box of a group of primitives. FIG. 8a shows a primitive 802 with a bounding box 804. The bounding box is an axis-aligned bounding box.

For example, the bounding boxes may be nodes of the scene hierarchy 124 received from the scene hierarchy unit 110. Intersection testing against axis-aligned bounding boxes is relatively simple to implement compared to intersection testing against primitives or non-axis aligned bounding boxes. In this way, the intersection testing logic 106 may be considered to comprise a box intersection tester configured to perform intersection testing on the ray by identifying an intersection of the ray with a bounding box of one or more primitives in the scene.

Figure 8B:
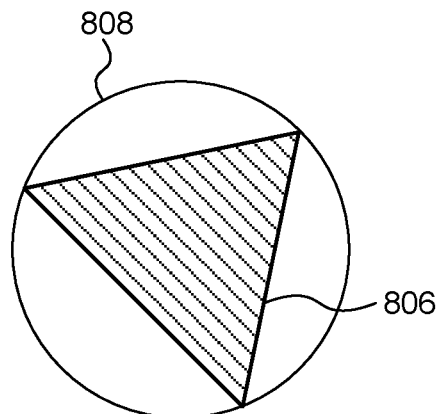
FIG. 8b shows a sphere bounding a primitive.
Figure 8C:
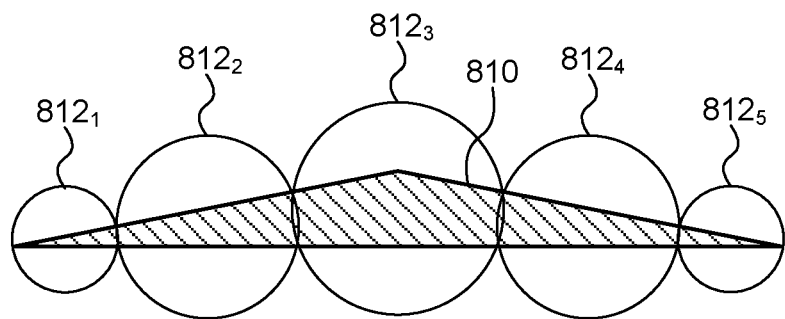
FIG. 8c shows a plurality of spheres which collectively bound a primitive.

The intersection testing processing core(s) 118 may implement a sphere intersection tester which performs intersection testing of rays against spheres which represent the position of portions of geometry in the scene. FIG. 8b shows a primitive 806 with a sphere 808 that bounds the primitive 806. Using a single sphere to bound a single primitive can be useful for the purposes of intersection testing for primitives which are close to equilateral triangles. However, for primitives which are more elongated, such as the primitive 810 shown in FIG. 8c it may be beneficial to use a plurality of spheres ($812_1$ to $812_5$) to represent the position of the primitive 810 for the purposes of intersection testing. For example, the sphere(s) may be node(s) of the scene hierarchy 124 received from the scene hierarchy unit 110. Intersection testing against a sphere is relatively simple to implement compared to intersection testing against primitives. In this way, the intersection testing logic 106 may be considered to comprise a sphere intersection tester configured to perform intersection testing on the ray by identifying an intersection of the ray with a sphere representing the position of a portion of geometry in the scene.

The intersection testing processing core(s) 118 may be configured to implement any suitable type of intersection tester. As an example, an intersection tester may be a plane tester which tests for an intersection between a ray and a plane in the scene. This can be useful for testing intersection of rays with splitting planes which can be used for space partitioning trees. As another example, an intersection tester may test for intersection of a ray with implicit surfaces and/or procedural surfaces within the scene.

In some examples, the intersection testing logic 106 may implement a programmable intersection tester (e.g. by running a suitable software program on the processing core(s) 118) that can operate on unnormalised ray direction values and unnormalised ray clipping distances, and which may atomically update the hit distance on a ray when an intersection is found.

In some examples, shader programs executed on the execution unit(s) 108 may implement intersection testing, such that the intersection testing logic module 106 is not needed in the ray tracing unit. An instruction set may be used for implementing shader programs, in particular for implementing intersection shader programs to evaluate whether a ray-primitive hit occurred and if so at what distance from the ray's origin. The instruction set may include special instructions for compression, unpacking, and decompression of ray direction data as described herein. The instruction set or programming model for shaders with the purpose of performing intersection testing may also include one or more of: (i) a means to provide access to a native compressed ray data structure, (ii) a means to map between the distances along the ray in the ray's Manhattan space and world space, and (iii) any other data or functionality to enhance the efficiency of performing intersection calculations with rays comprising compressed direction vectors.

Whether to use bounding boxes or spheres (or any other shape) as nodes of the scene hierarchy 124 to represent the position of the geometry in the scene is an implementation choice, the details of which are outside of the scope of this disclosure, which is made when deciding how to build the scene hierarchy in the scene hierarchy unit 110.

After the intersection testing has been performed using the unnormalised ray direction vector, the results of the intersection testing can be used for rendering an image of the scene, e.g. in steps S710 to S712.

In step S710 the results of the intersection testing (e.g. an identification of a primitive with which the ray intersects and a hit distance, or an indication that the ray did not intersect any geometry in the scene) are passed to the shader execution unit(s) 108, thereby invoking one or more shader programs to be executed on the execution unit(s) 108.

In step S711 the decompression of the ray direction vector is completed. This step may be performed by a shader program executing on the execution unit(s) 108. In the example described above, completing the decompression of the ray direction vector involves normalising the unpacked ray direction vector, according to the L2 norm. Step S711 may also involve normalising the hit distance, according to the L2 norm. Shader programs which act on the results of intersection testing may make use of the ray direction vector and/or the hit distance, so it is useful to normalise the ray direction vector and/or the hit distance in step S711. However, if one or both of the ray direction vector and the hit distance are not used by a shader program acting on the results of the intersection testing, then the respective one or both of the ray direction vector and the hit distance might not be normalised in step S711.

In step S712 the shader execution unit(s) 108 execute the invoked shader program(s) for rendering an image of the scene. As described above, shader programs can perform a wide variety of functions when executed on the execution core(s) 108, and the execution of some shader programs may emit one or more further rays to be processed in the ray tracing system 100. Rays which are emitted by the execution of the shader programs can be passed back to the intersection testing logic 106 for intersection testing. The emitted rays may be processed by the ray compression module 116 so that the ray direction data can be compressed as described above with reference to the flow chart in FIG. 5. The ray data can be stored in the local ray memory 112 and/or in the ray data memory 126.

Rendered image values (e.g. pixel values) which are generated by the execution of the shaders in the execution unit(s) 108 may be output to the frame buffer 130 and stored therein. When all of the pixel values for an image have been rendered and stored in the frame buffer 130 then the rendered image can be used in any suitable manner, e.g. provided to a display for display thereon, or transmitted to another device (e.g. over a network such as a local network or the Internet), or passed to another memory for storage therein, etc.

Figure 9:
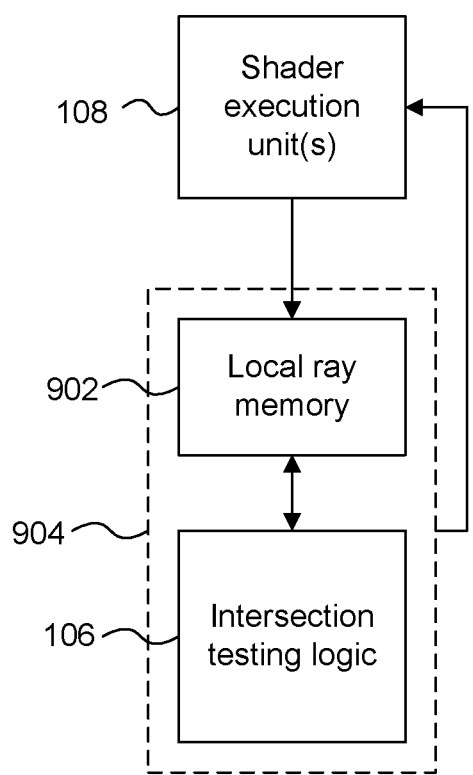
FIG. 9 shows some components of a ray tracing system.
Figure 10:
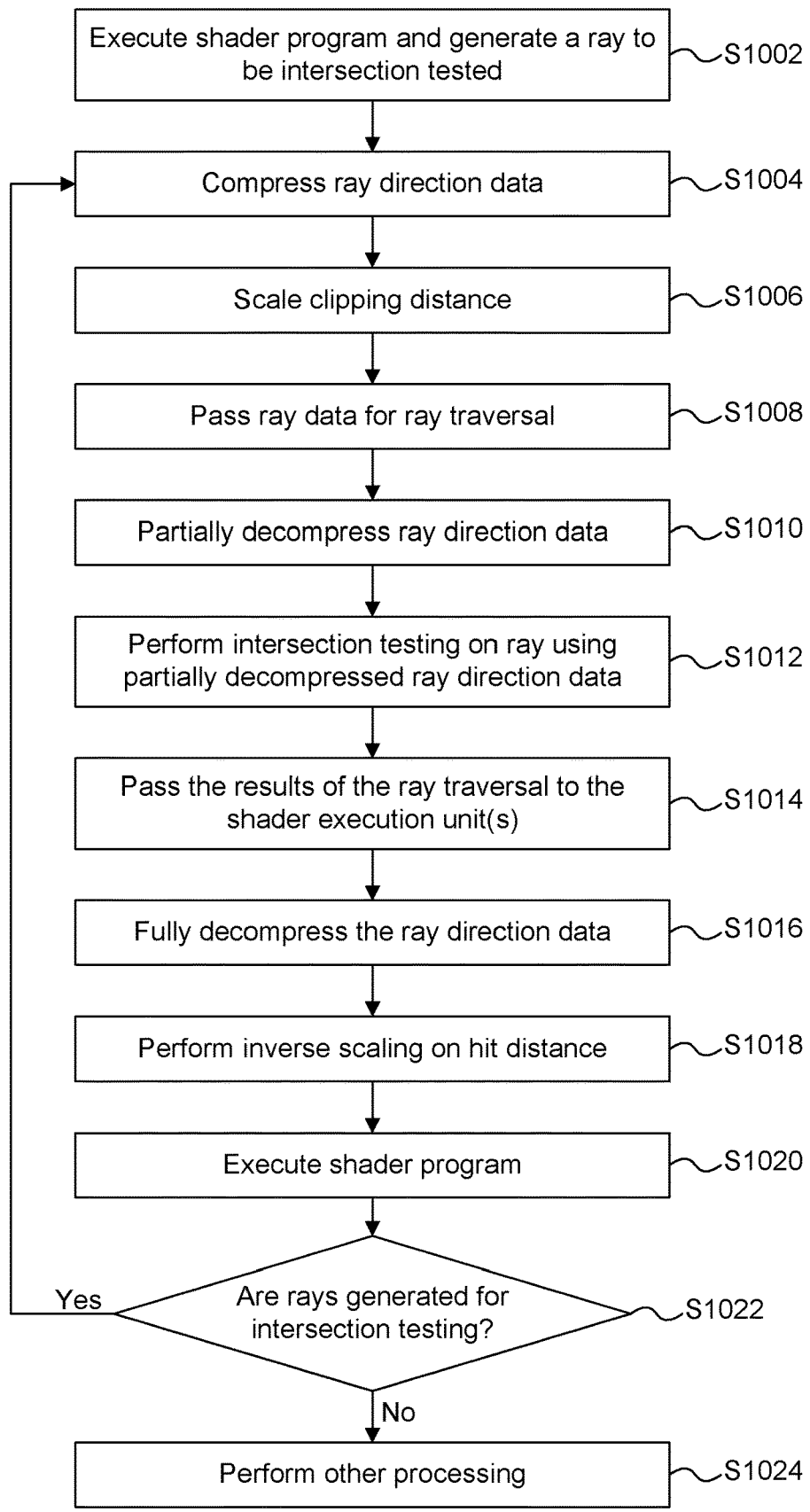
FIG. 10 is a flow chart for a method of processing rays in a ray tracing system.

FIG. 9 shows parts of a ray tracing system and FIG. 10 shows a flow chart for a method of processing rays in the ray tracing system. Ray data is passed between the shader execution unit(s) 108, a ray memory 902 (which may be the local ray memory 112 or the ray data memory 126) and the intersection testing logic 106 in an example. The dashed box 904 represents the ray traversal functionality, and includes the ray memory 902 and the intersection testing logic 106. As described above, in step S1002 shader programs are executed on the execution unit(s) 108 and may result in rays being generated which are to be intersection tested by the intersection testing logic 106. In step S1004, the ray direction data is compressed by a shader program executed on the execution unit(s) 108 (e.g. by the ray compression module 116). For example, the ray data may be compressed into an octahedral vector format, but as described in more detail below, other compressed formats may be used. In step S1006, the ray's clipping distance is scaled as described above. In step S1008, the ray data (including the compressed ray direction data and the scaled clipping distance) is passed from the execution unit(s) 108 for ray traversal in box 902. In particular, the ray data (including the compressed ray direction data and the scaled clipping distance) is passed from the execution unit(s) 108 to the ray memory 902, for storage therein. It is noted that carrying the ray-specific, scaled clipping distance with the ray data passed from the execution unit(s) 108 to the ray memory 902 is a useful optimizing feature, but it is not fundamentally required, and in some examples, the scaled clipping distance is not determined by a shader program executing in the shader execution unit(s) 108 and is not stored in the ray memory 902.

In step S1010, the intersection testing logic 106 retrieves ray data from the ray memory 902, and partially decompresses the ray direction data (e.g. using the unpacking logic 120). This partial decompression of the ray direction data does not involve normalising the ray direction vector, so an unnormalised ray direction vector is used in the intersection testing. In step S1012 the intersection testing logic 106 performs intersection testing on the ray using the partially decompressed (i.e. unnormalised) ray direction data. As described above, an unnormalised ray direction vector can be used in the intersection testing because the intersection identifications of the intersection tests (i.e. hit or miss) will not change. Using the scaled clipping distance means that the clipping distance is adjusted to account for the ray direction vector being unnormalised. As described above, the hit distance determined by the intersection testing logic 106 will be unnormalised.

In step S1014, the results of the intersection testing are passed from the ray traversal logic 904 (e.g. from the intersection testing logic 106 and/or the ray memory 902) to the shader execution unit(s) 108. For example, an indication of an intersection between a ray and a primitive in the scene may be passed to the shader execution unit(s), and one or more shader programs can be executed on the shader execution unit(s) 108 to process the intersection testing results. The ray data for the ray (e.g. including the compressed ray direction data or the unpacked but unnormalised ray direction data) may be passed from the ray memory 902 to the shader execution unit(s) 108. The unnormalised hit distance may be passed from the intersection testing logic 106 to the shader execution unit(s) 108.

In step S1016, a shader program executed on the shader execution unit(s) 108 determines the fully decompressed ray direction data, e.g. by unpacking and normalising the compressed ray direction data or by normalising the partially decompressed ray direction data (where the "partially decompressed ray direction data" is the already-unpacked ray direction data). In step S1018, the shader program performs an inverse-scaling operation on the hit distance, to thereby normalise the hit distance. In some examples, the decompression of the ray direction data (in step S1016) and/or the inverse-scaling of the hit distance (in step S1018) may be performed by dedicated hardware (e.g. fixed-function circuitry) rather than being performed by a software shader program executing on the execution unit(s) 108 as described above. Steps S1016 and S1018 may be optional. For example, if a shader program does not make use of the ray direction and/or the hit distance then steps S1016 and/or S1018 might not be performed respectively.

In step S1020 the shader execution unit(s) 108 execute a shader program in order to process the intersection results. For example, the execution of the shader program in step S1020 may involve determining a colour value for a pixel of an image, and may involve generating further rays to be tested for intersection in the scene. In step S1022, it is determined whether any rays have been generated for intersection testing, and if they have then the method passes back to step S1004. If it is determined in step S1022 that no rays have been generated by the execution of the shader program in step S1020 then the method passes to step S1024 in which other processing is performed. For example, further rays may be processed, e.g. by returning to step S1002.

To reiterate some of the details of the examples described above, the intersection testing logic 106 performs intersection testing on a ray in the scene using an unnormalised ray direction vector for the ray; i.e. without normalising the ray direction vector. The intersection testing does not use a normalised ray direction vector. Intersection tests are performed with the unnormalised ray direction vector. Therefore, a ray vector representing the ray, on which intersection testing is performed, is constructed to pass through a point given by the ray origin for the ray and is constructed to have the direction of the unnormalised ray direction vector. The intersection tests involve testing whether the ray vector intersects any elements of geometry (e.g. primitives) or any nodes of an acceleration structure representing the position of geometry in the scene. It is noted that the ray direction vector may be normalised for purposes other than intersection testing, but for the purposes of intersection testing the ray direction vector is not normalised. The avoidance of a step of normalising the ray direction vector for every ray that is processed by the intersection testing logic 106 reduces the power consumption and latency of the ray tracing system 100.

In the examples described above, an octahedral vector format is used for the ray direction data, and the ray direction data is partially decompressed (i.e. not fully decompressed) for the purposes of intersection testing. In other examples, other types of vector format (i.e. not an octahedral vector format) may be used for the ray direction data, and the system can still partially decompress (i.e. not fully decompress) the ray direction data for the purposes of intersection testing. The same benefits in terms of reducing the processing performed for intersection testing can be achieved (by only partially decompressing the ray direction data, e.g. by avoiding the normalisation step) with other compressed formats. Some other suitable formats include a block-floating-point format (i.e. one shared exponent for all 3 components), and an integer format (i.e. no exponent, but not reduced to 2 components, so all 3 (x,y,z) components are still needed). Another suitable format is a bundled ray format where multiple rays share some high order bits. In some examples, whichever format is used (i.e. not necessarily an octahedral vector format), ray data is compressed between shading and intersection testing.

Figure 11:
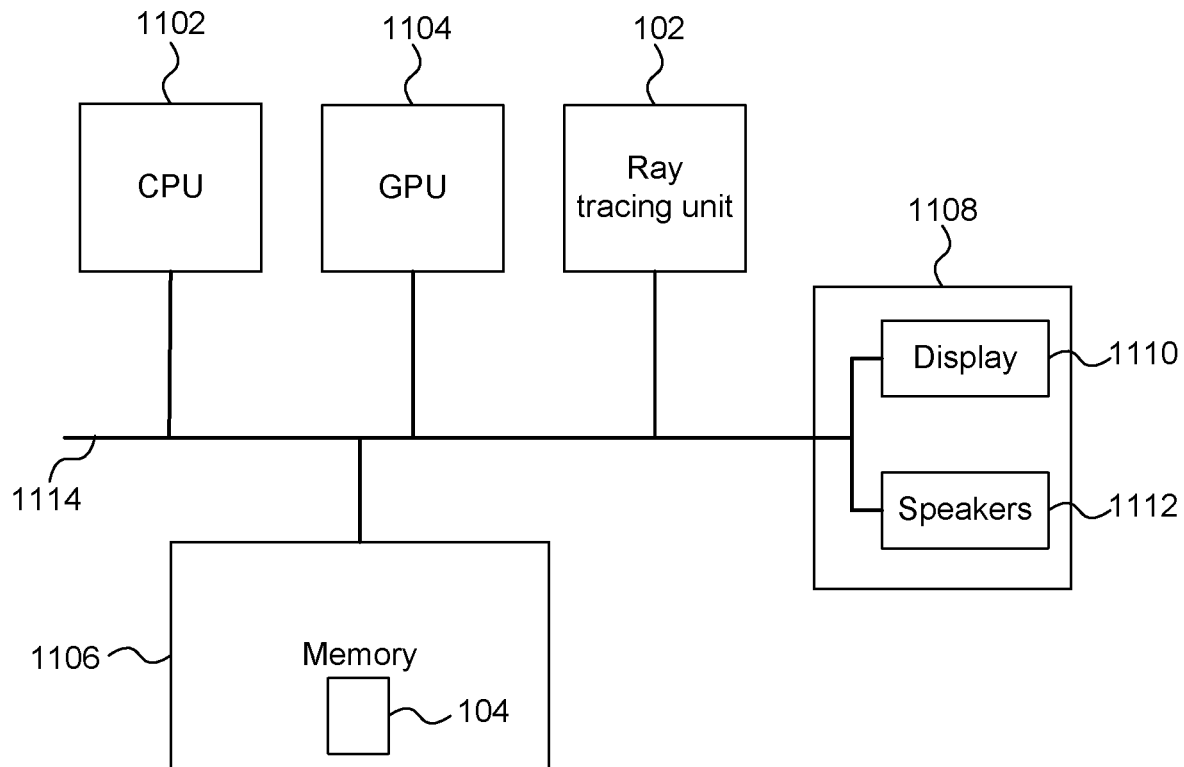
FIG. 11 shows a computer system in which a ray tracing system is implemented.

FIG. 11 shows a computer system in which the ray tracing systems described herein may be implemented. The computer system comprises the ray tracing unit 102, a CPU 1102, a GPU 1104, a memory 1106 and other devices 1108, such as a display 1110 and speakers 1112. The components of the computer system can communicate with each other via a communications bus 1114. The memory 104 is implemented as part of the memory 1106.

The ray tracing system 100 of FIG. 1 is shown as comprising a number of functional blocks. This is schematic only and is not intended to define a strict division between different logic elements of such entities. Each functional block may be provided in any suitable manner. It is to be understood that intermediate values described herein as being formed by a ray tracing system need not be physically generated by the ray tracing unit at any point and may merely represent logical values which conveniently describe the processing performed by the ray tracing system between its input and output.

The ray tracing systems described herein may be embodied in hardware on an integrated circuit. The ray tracing systems described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor.

The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture a ray tracing system configured to perform any of the methods described herein, or to manufacture a ray tracing system comprising any apparatus described herein. An integrated circuit definition dataset may be, for example, an integrated circuit description.

Therefore, there may be provided a method of manufacturing, at an integrated circuit manufacturing system, a ray tracing system as described herein. Furthermore, there may be provided an integrated circuit definition dataset that, when processed in an integrated circuit manufacturing system, causes the method of manufacturing a ray tracing system to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a ray tracing system will now be described with respect to FIG. 12.

Figure 12:
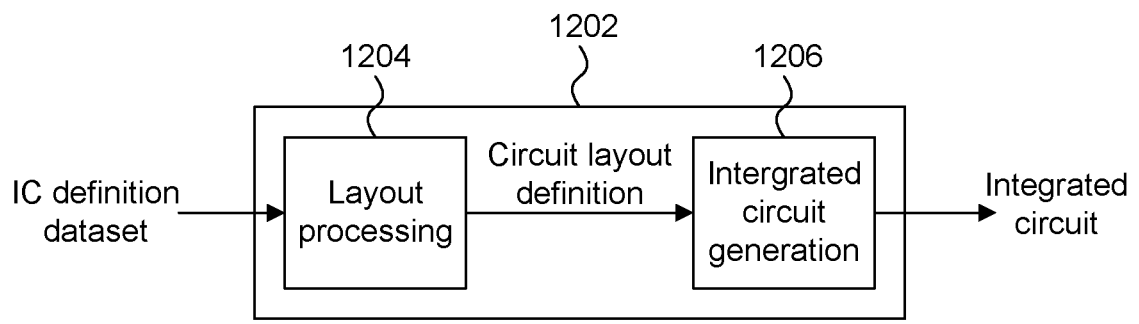
FIG. 12 shows an integrated circuit manufacturing system for generating an integrated circuit embodying a ray tracing system.

FIG. 12 shows an example of an integrated circuit (IC) manufacturing system 1202 which is configured to manufacture a ray tracing system (e.g. a ray tracing unit) as described in any of the examples herein. In particular, the IC manufacturing system 1202 comprises a layout processing system 1204 and an integrated circuit generation system 1206. The IC manufacturing system 1202 is configured to receive an IC definition dataset (e.g. defining a ray tracing system as described in any of the examples herein), process the IC definition dataset, and generate an IC according to the IC definition dataset (e.g. which embodies a ray tracing system as described in any of the examples herein). The processing of the IC definition dataset configures the IC manufacturing system 1202 to manufacture an integrated circuit embodying a ray tracing system as described in any of the examples herein.

The layout processing system 1204 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1204 has determined the circuit layout it may output a circuit layout definition to the IC generation system 1206. A circuit layout definition may be, for example, a circuit layout description.

The IC generation system 1206 generates an IC according to the circuit layout definition, as is known in the art. For example, the IC generation system 1206 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1206 may be in the form of computer-readable code which the IC generation system 1206 can use to form a suitable mask for use in generating an IC.

The different processes performed by the IC manufacturing system 1202 may be implemented all in one location, e.g. by one party. Alternatively, the IC manufacturing system 1202 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a ray tracing system without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 12 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 12, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A ray compression module for use in a ray tracing system, the ray compression module configured to:
    obtain ray direction data for a ray to be processed in the ray tracing system, the ray direction data comprising three components representing a direction of the ray in the three-dimensional space of a scene to be rendered;
    compress the ray direction data for the ray in accordance with an octahedral vector format which uses two parameters to reference a position on an octahedron to represent the ray direction;
    cause the compressed ray direction data for the ray to be stored in a memory for subsequent use in performing intersection testing on the ray in the ray tracing system;
    scale a clipping distance of the ray by an amount based on the magnitude of an unnormalised ray direction vector for the ray, wherein the unnormalised ray direction vector is a projection of an uncompressed ray direction vector for the ray onto the octahedron; and
    cause the scaled clipping distance of the ray to be stored.

2. The ray compression module of claim 1, wherein the ray compression module is implemented as a software module to be executed on one or more execution units in the ray tracing system.

3. The ray compression module of claim 1, wherein the ray compression module is configured to obtain the ray direction data for the ray from a shader program which generates the ray, wherein uncompressed ray direction data for the ray is not stored in a memory prior to the ray compression module compressing the ray direction data for the ray.

4. The ray compression module of claim 1, wherein the ray compression module is configured to obtain the ray direction data for the ray from a memory.

5. A ray tracing system for use in rendering an image of a scene, the ray tracing system comprising:
    the ray compression module of claim 1;
    the memory configured to store the compressed ray direction data for the ray; and
    intersection testing logic configured to:
    partially decompress the compressed ray direction data for the ray to determine partially decompressed ray direction data which is not fully decompressed; and
    perform intersection testing on the ray in the scene using the partially decompressed ray direction data for the ray;
    wherein the ray tracing system is configured to use results of the intersection testing for rendering the image of the scene.

6. The ray tracing system of claim 5, wherein the intersection testing logic is configured to partially decompress the compressed ray direction data for the ray by constructing an unnormalised ray direction vector for the ray by unpacking the compressed ray direction data for the ray, wherein the intersection testing logic is configured to perform the intersection testing on the ray using the unnormalised ray direction vector for the ray rather than a normalised ray direction vector for the ray.

7. The ray tracing system of claim 6, wherein the intersection testing unit is configured to make use of the scaled clipping distance for the ray.

8. A ray compression method comprising:
    obtaining ray direction data for a ray to be processed in a ray tracing system, the ray direction data comprising three components representing a direction of the ray in the three-dimensional space of a scene to be rendered;

compressing the ray direction data for the ray in accordance with an octahedral vector format which uses two parameters to reference a position on an octahedron to represent the ray direction;

scaling a clipping distance of the ray by transforming the clipping distance for the ray into Manhattan space;

storing the compressed ray direction data for the ray in a memory for subsequent use in performing intersection testing on the ray; and storing the scaled clipping distance of the ray.

9. The method of claim 8, wherein core ray data for the ray is stored in the memory, whereas at least some non-core ray data for the ray is stored in a separate memory, wherein the compressed ray direction data is included in the core ray data for the ray.

10. A method of processing data in a ray tracing system, the method comprising:

executing a shader program which outputs a ray for intersection testing;

compressing ray direction data for the ray;

storing the compressed ray direction data;

scaling a clipping distance of the ray by an amount based on the magnitude of an unnormalised ray direction vector for the ray, wherein the unnormalised ray direction vector is a projection of an uncompressed ray direction vector for the ray onto an octahedron;

storing the scaled clipping distance of the ray; and performing intersection testing on the ray without fully decompressing the compressed ray direction data, wherein the ray tracing system is configured to use results of the intersection testing for rendering the image of the scene.

11. The method of claim 10, wherein said compressing ray direction data for the ray is performed by a ray compression module implemented as a software module executed on at least one execution unit of the ray tracing system.

12. The method of claim 10, wherein said compressing ray direction data for the ray is performed by a ray compression module implemented in fixed-function circuitry as a dedicated hardware module in the ray tracing system.

13. The method of claim 10, wherein the compressed ray direction data for the ray is stored with other ray data for the ray, said other data including a ray origin and a clipping distance for the ray, and wherein the compressed ray direction data, the ray origin and the clipping distance for the ray are retrieved from a memory for use in performing said intersection testing on the ray.

14. The method of claim 10, wherein the intersection testing is performed on the ray without fully decompressing the ray direction data by using the compressed ray direction data in the intersection testing of the ray.

15. The method of claim 10, wherein the intersection testing is performed on the ray without fully decompressing the ray direction data by partially decompressing the compressed ray direction data and then using the partially decompressed ray direction data in the intersection testing of the ray.

16. The method of claim 10 further comprising executing a shader program which uses results of the intersection testing for rendering the image of the scene, wherein the ray direction data for the ray is fully decompressed for use by the shader program.

* * * * *